United States Patent [19]

Ghilardi

[11] Patent Number: 5,526,862
[45] Date of Patent: Jun. 18, 1996

[54] SELF-SUPPORTING TIRE FOR MOTOR-VEHICLE WHEELS INCORPORATING ELASTIC SUPPORT INSERTS IN THE SIDEWALLS

[75] Inventor: Giuliano Ghilardi, Milan, Italy

[73] Assignee: Pirelli Coordinamento Pneumatici S.p.A., Milan, Italy

[21] Appl. No.: 382,190

[22] Filed: Feb. 1, 1995

Related U.S. Application Data

[62] Division of Ser. No. 975,327, Nov. 16, 1992, Pat. No. 5,413,160.

[30] Foreign Application Priority Data

Nov. 15, 1991 [IT] Italy ................................ MI91A3045
Jul. 31, 1992 [IT] Italy ................................ MI92A1886

[51] Int. Cl.⁶ ............................ B60C 17/04; B60C 17/06
[52] U.S. Cl. ........................ 152/458; 152/517; 152/549; 152/555
[58] Field of Search ........................ 152/516–517, 152/549, 555, 458

[56] References Cited

U.S. PATENT DOCUMENTS

| | | |
|---|---|---|
| 3,717,190 | 2/1973 | Boileau . |
| 3,954,131 | 5/1976 | Hoshino et al. ................ 152/555 |
| 4,287,924 | 9/1981 | Deck et al. . |
| 4,779,658 | 10/1988 | Kawabata et al. ............... 152/555 |
| 5,058,646 | 10/1991 | Kajikawa et al. ............... 152/555 |
| 5,238,040 | 8/1993 | Ghilardi ........................ 152/517 |
| 5,309,970 | 5/1994 | Kawabata et al. ............... 152/517 |

FOREIGN PATENT DOCUMENTS

| | | |
|---|---|---|
| 0005399 | 11/1979 | European Pat. Off. . |
| 0385192 | 9/1990 | European Pat. Off. . |
| 0475258 | 3/1992 | European Pat. Off. . |
| 0495375 | 7/1992 | European Pat. Off. . |
| 515226 | 11/1992 | European Pat. Off. ........ 152/555 |
| 2469297 | 5/1981 | France . |
| 2526758 | 12/1976 | Germany . |
| 62689 | 10/1971 | Luxembourg . |
| 2053815 | 2/1981 | United Kingdom . |
| 2087805 | 6/1982 | United Kingdom . |

*Primary Examiner*—Adrienne C. Johnstone
*Attorney, Agent, or Firm*—Watson Cole Stevens Davis

[57] ABSTRACT

A tire, intended to be inflated but capable of running in a deflated condition, the carcass (2) of which incorporates, at each of the sidewalls (5) thereof, a first and a second reinforcing insert (16, 17) having in section a substantially lenticular form tapering to the ends, interposed between a first carcass ply (10) and a second carcass ply (11) and mutually joined at the tire maximum-chord point. Also applied to each sidewall against the carcass ply (10) turned to the inner part of the tire is an elastic support insert (13) of lenticular section having a maximum thickness portion (13a) disposed at the junction point (18) between the two reinforcing insertions (16, 17). The elastic support insert (13) comprises a substantially stiff counter core (14) of lenticular section, and a cover (15) made of elastomeric material have a low modulus of elasticity, coating the counter core (14) at one side thereof turned towards the carcass plies.

9 Claims, 2 Drawing Sheets

SELF-SUPPORTING TIRE FOR MOTOR-VEHICLE WHEELS INCORPORATING ELASTIC SUPPORT INSERTS IN THE SIDEWALLS

This is a divisional of application Ser. No. 07/975,327, filed Nov. 16, 1992, now U.S. Pat. No. 5,413,160.

BACKGROUND OF THE INVENTION

The present invention relates a motor vehicle tire assigned to be inflated but capable of operating satisfactorily over long distances without inflation. More particularly it relates to a self-supporting tire for motor-vehicle wheels incorporating elastic support inserts in the sidewalls, comprising a carcass, a tread band disposed on the crown of said carcass, and a circumferentially-inextensible annular belt structure, overlying said carcass so as to form an annulus at a radially inner position to said tread band, that is, sandwiched between the carcass and the tread band. More particularly, the invention comprises the combination of: a pair of circumferentially inextensible reinforcing rings or bead cores, each positioned within in a bead defined along an inner circumferential edge of a tire; a pair of elastomeric fillers each of which extends along an outer circumferential edge of one of the bead cores tapering away from the tire axis; at least one carcass ply having its edges folded back around the bead cores and elastomeric fillers; at least a pair of annular elastic support inserts of lenticular cross-sectional form, made of elastomeric material, each of which is applied to the carcass ply against the inner part of one of the tire sidewalls extending radially between one of the beads and the corresponding edge of the belt structure.

It is known that there are motor-vehicle tires provided with a self-supporting carcass, that is capable of supporting the vertical loads and side thrusts transmitted to the tire even when it is operated under completely deflated conditions. In this way, in case of puncture of one or more tires, the motor-vehicle will be still able to travel over rather long distances even at relatively high speeds, without important losses occurring in terms of road-holding and ride comfort.

One known type of self-supporting carcass substantially provides that an annular support insert of lenticular cross-sectional form and made of elastomeric material be associated with each of the tire sidewalls, said insert being applied to the carcass ply or plies which, as known, are provided in the tire itself. These inserts having relatively high thickness and modulus of elasticity, are adapted to bend so as to offer sufficient elastic reaction to the vertical loads and horizontal side thrusts transmitted to the tire in a deflated condition.

In order to enable elastomeric inserts of smaller thickness and lower modulus of elasticity to be used, so as to improve the ride comfort and reduce the heat generation within the tire, according to another known type of self-supporting carcass each of the tire sidewalls is provided with two annular elastomeric support inserts disposed in side by side relation with respect to each other, at least one of which is interposed between two carcass plies.

The applicant has recently studied and set up another type of self-supporting carcass as described in the published European Patent Application EP 475258 which corresponds to allowed U.S. application Ser. No. 07/760,394, filed Sep. 16, 1991, now U.S. Pat. No. 5,238,040 in which, for each tire sidewall, an annular elastic support insert is provided which is positioned within the sidewall, against a first carcass ply. Combined with this elastic support insert is a pair of annular reinforcing inserts disposed substantially in radial alignment relationship between the first carcass ply and a second carcass ply laid on top (radially and axially outward) of the first ply. The reinforcing inserts are consecutively connected to each other at a junction point located at the height of the maximum-thickness area of the support insert and substantially coincident with the maximum-chord point of the tire.

During tire use the elastic support insert is deformed in the presence of bending stresses in order to elastically counteract the mutual approaching of the reinforcing inserts that substantially behave as stiff arms mutually hinged at their junction point.

In accordance with the present invention it has been found that by providing the elastic support insert with a substantially stiff core occupying at least the maximum-chord point of the tire, and more exactly the area in which compressive deformations are greatly concentrated, an important increase in the carcass lift under deflated conditions of the tire is achieved. Thus according to the invention very soft materials may be used for making the remaining part (other than the core) of the support insert, so as to greatly improve the ride comfort under any use condition.

SUMMARY OF THE INVENTION

The present invention in one aspect relates to a self-supporting tire for vehicle wheels incorporating elastic support inserts in the sidewalls, characterized in that each of said annular elastic support inserts comprises: a counter core of substantially lenticular cross-sectional form occupying at least partly an area of maximum thickness of the elastic support insert and having an abutment side of convex profile facing axially outward toward the radially innermost carcass ply; an elastically deformable cover covering the counter core at least partly on said abutment side and defining at least one terminal end portion of the elastic support insert, said cover having a lower dynamic modulus than that of the counter core.

The invention in another aspect relates to a tire the carcass of which further comprises, within each tire sidewall, a first and a second annular reinforcing insert made of elastomeric material, interposed between a first carcass ply and a second carcass ply disposed upon and outwardly of the first carcass ply, said first and second reinforcing inserts having a substantially lenticular cross-section which becomes thinner towards the ends thereof, and being mutually interconnected at a junction point located substantially at the height (above the tire's axis) of the maximum thickness area of the elastic support insert.

In one embodiment, the counter core defines a radially external terminal end portion of the elastic support insert. In greater detail, the counter core substantially extends from the maximum-chord region of the tire under deflated conditions, to near the side edge of the belt structure. In said maximum-chord region the counter core has its maximum thickness area.

In said one embodiment the cover coats the abutment side of the counter core from a radially internal end thereof to near the maximum-thickness area of the core itself, the remaining part of the abutment side being applied against said carcass ply.

In a second embodiment, the counter core is completely disposed substantially at the maximum width point of the tire and the cover completely covering said abutment side defines both the inner and outer end portions of the elastic support insert. In this case, the cover at the counter core preferably has a minimum thickness lower than 2.5 mm.

The counter core, optionally made of elastomeric material incorporating reinforcing fibers, preferably has a dynamic modulus included between 8 and 12 Megapascal (MPa) and low hysteresis loss (tan δ less than 0.1).

In accordance with a further feature of the invention, the cross-sectional area of the counter core is included between 30% and 60% of the overall cross-sectional area of said elastic support insert.

It is also preferentially provided that the counter core should have a maximum radial extension included between ¼ and ¾ of the overall radial extension of said elastic support insert.

In accordance with a further feature of the invention, the dynamic modulus of the cover is preferably between 2 and 6 MPa.

BRIEF DESCRIPTION OF THE DRAWINGS

Further features and advantages will become more apparent from the detailed description of preferred embodiments of a self-supporting tire for vehicle wheels incorporating elastic support inserts in the sidewalls in accordance with the present invention, given hereinafter by way of non-limiting example with reference to the accompanying drawings, in which.

DETAILED DESCRIPTION OF THE PREFERRED EMBODIMENTS

Figure 1:
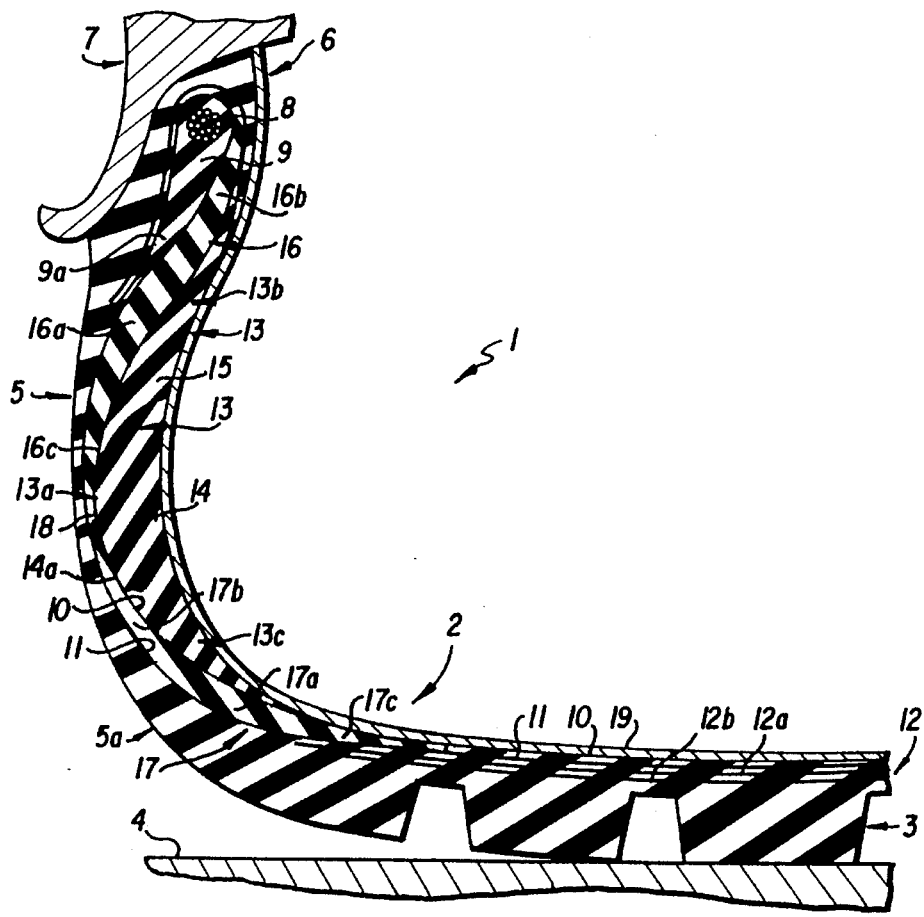
FIG. 1 shows the left half of a cross-sectional profile of one embodiment of a tire made in accordance with the present invention, in a normally inflated condition; the right half is a mirror image thereof.

Referring to the drawings a self-supporting tire for motor vehicles incorporating elastic support inserts in the sidewalls in accordance with the present invention, has been generally identified by reference numeral 1.

Tire 1 comprises a carcass 2, preferably of the radial type, around which, as known, there is defined a tread band 3 in the form of an annulus and arranged to contact a roadway 4, a belt structure 12, disposed on the crown of said carcass, and two sidewalls 5 (only one of which is shown) extending in a substantially radial direction from the opposite edges of the tread band 3 and terminating in two beads 6 (only one of which is shown) defined along the inner circumferential edges of the tire 1. At the beads 6 the tire 1 is engaged to a mounting rim 7 of a motor vehicle wheel.

Carcass 2 conventionally comprises a pair of circumferentially inextensible reinforcing rings 8 commonly referred to as "bead cores" each of which carries, along the outer circumferential edge thereof, an elastomeric filler 9 tapering away from the tire axis. The bead cores 8, each of which is molded within one of the beads 6, give said beads the necessary stiffness to ensure that the mounting rim 7 will hold the tire 1 in the best manner.

In addition, carcass 2 has at least one carcass ply such as first carcass ply 10 extending along the whole tire cross-section. The first carcass ply 10 has its opposite edges folded back around the respective bead cores 8.

In a preferred embodiment, a second carcass ply 11 is also provided which is disposed upon the first carcass ply 10 and also has its edges folded back around the respective bead cores 8.

Still in a manner known per se, said circumferentially inextensible belt structure 12 is comprised of one or more belt bands 12a, 12b which are superposed as an annulus on the carcass plies 10, 11.

For the sake of clarity, in the accompanying drawings the various carcass plies 10, 11 and belt bands 12a, 12b are merely represented by solid lines, spaced apart from each other. Actually, said plies are superposed in mutual contacting relationship, except at the sidewalls 5, as will be better clarified below.

In accordance with the present invention, the tire 1 further comprises, at each sidewall 5, at least one annular elastic support insert 13 applied to the first carcass ply 10, at an axially inner position relative to the tire 1. The elastic support insert 13 extends radially between the respective bead 6 and the corresponding edge of the belt band 12 following a profile of substantially lenticular cross-section. In greater detail, the elastic support insert 13 has a central area of maximum thickness 13a disposed substantially at the same height as the maximum-chord point, that is the maximum width point of the tire 1. More specifically, this maximum thickness area is located at the maximum-chord point taken by the tire 1 under deflection conditions, in the absence of inflating pressure. Departing from this maximum thickness area 13a in a substantially radial direction, is an inner end portion 13b tapering substantially towards the filler 9 and an outer end portion 13c tapering substantially towards the side edge of the belt band 12.

In a novel manner, the elastic support insert 13 comprises a counter core 14 of substantially lenticular cross-section occupying at least partly the maximum thickness area 13a and has an abutment side 14a of convex profile facing the carcass plies 10, 11. Combined with the counter core 14 is an elastically deformable cover covering the counter core at least on part of the abutment side 14a thereof.

The counter core 14 is made of elastomeric material having a high dynamic modulus, higher than 6 MPa and preferably included between 8 and 16 MPa. The counter core also has low hysteresis loss (tan δ lower than 0.1).

It is pointed out that all values relating to dynamic modulus and hysteresis loss (tan δ) cited in the present description are intended to be stated as measured on a test piece of elastomeric material and of cylindrical form (14 mm diameter, 25 mm length) preloaded with an axial deflection of 20% and submitted to a cyclic sinusoidal deformation of a width of: 7.5% and frequency of 100 Hz, the temperature being 100° C.

Measurements are carried out on the test piece put in an oven so as to ensure a constant temperature during the test, and after a conditioning time corresponding to 100 cycles of sinusoidal deformation.

Conveniently, in order to give the counter core 14 a dynamic modulus high enough, reinforcing fibers such as aramide, nylon or the like can be optionally incorporated in the elastomeric material used for making said core.

The cover 15, in turn, is made of elastomeric material having a dynamic modulus preferably ranging between 2 and 6 MPa and at all events lower than the dynamic modulus of the counter core 14.

Figure 2:
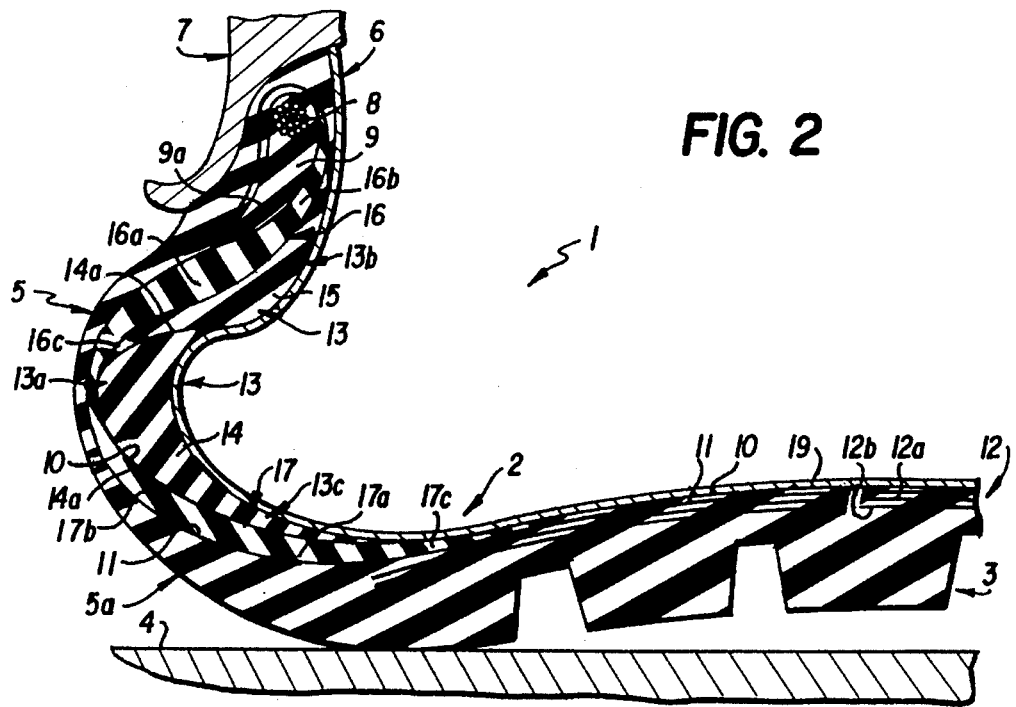
FIG. 2 is a cross-sectional view of the tire profile shown in FIG. 1 in a run flat condition.

In the preferred solution shown in FIGS. 1 and 2, the counter core 14 substantially extends from the maximum width region of the tire 1 to one side edge of the belt structure 2, so as to define the outer end portion 13c of the elastic support insert 13. Preferably, the maximum thickness area of the core 14 is coincident with the maximum thickness area of the elastic support insert 13 and, at all events, is substantially located in register with the maximum-chord area of the tire 1 under deflated conditions.

Still referring to FIGS. 1 and 2, the cover 15 defines the inner end portion 13b of the insert 13 and coats the abutment side 14a of the counter core 14 starting from the radially inner end of said core and going as far as the maximum thickness point of the same. The remaining part of the abutment side 14a which is not coated with cover 15, is directly applied against the first carcass ply 10.

Figure 3:
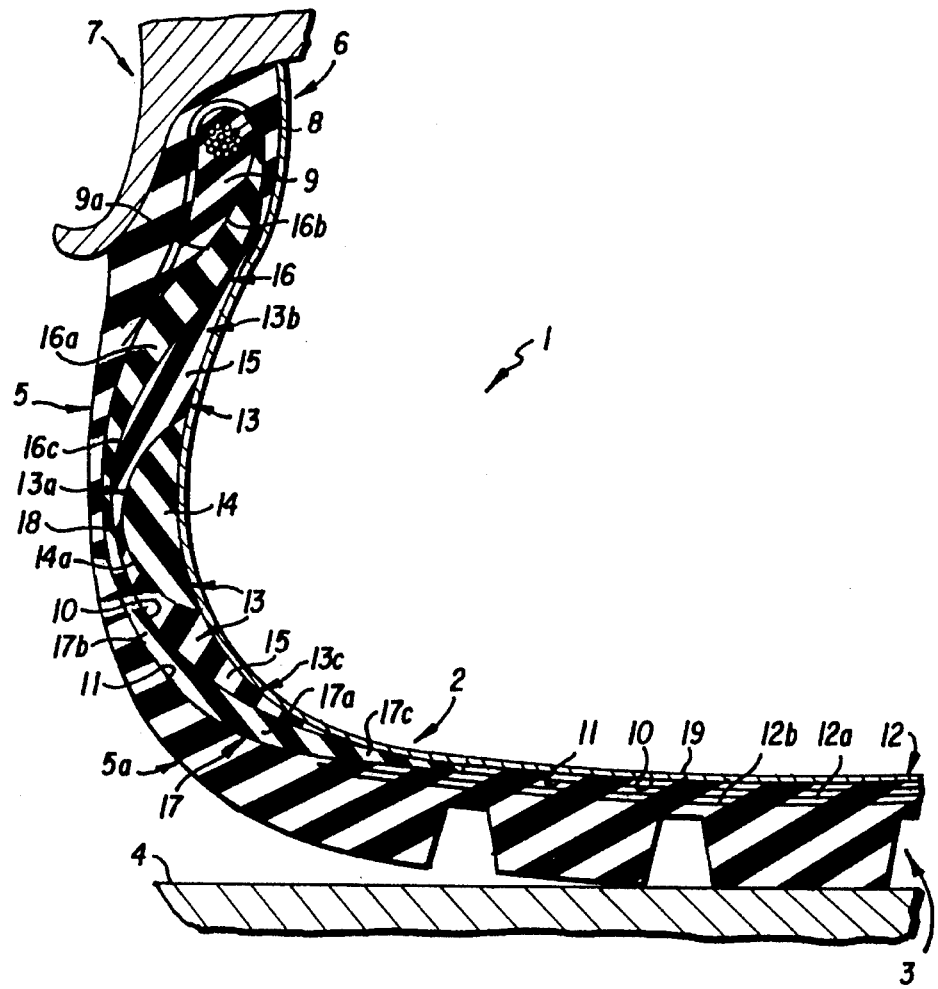
FIG. 3 shows the left half of a cross-sectional profile of a second embodiment of the tire of the invention, in a normally inflated condition; the right half is a mirror image thereof.
Figure 4:
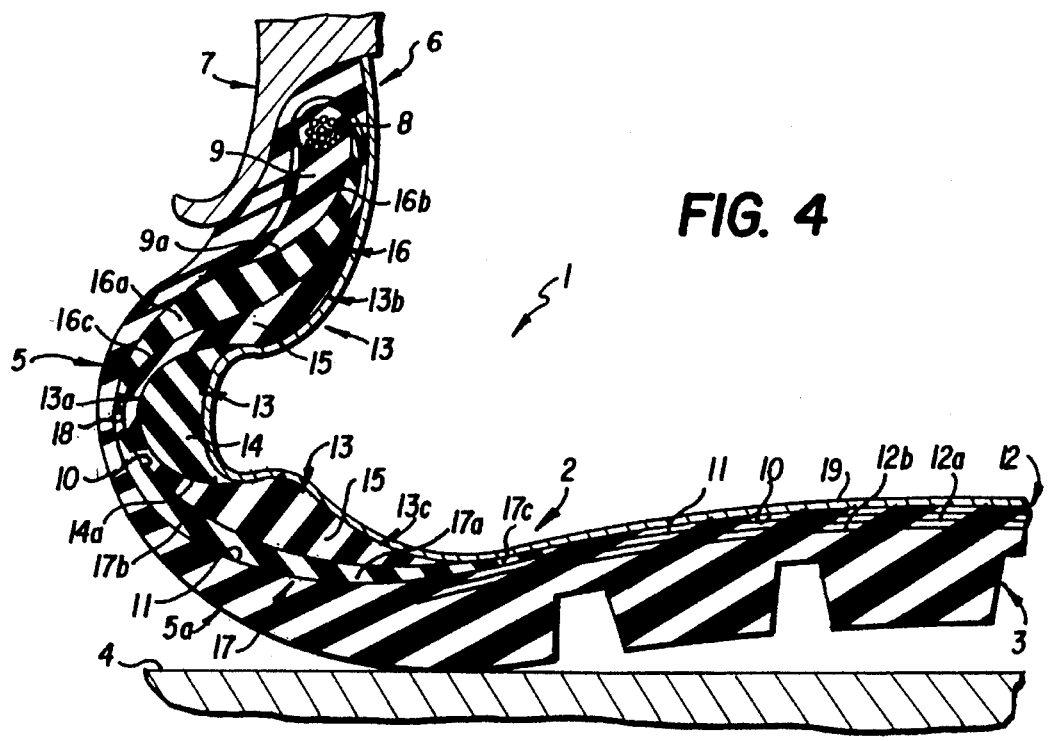
FIG. 4 is a cross-sectional view of the tire profile shown in FIG. 3, in a run flat condition.

In the embodiment shown in FIGS. 3 and 4 a smaller counter core 14 than above is provided, which is located at the maximum thickness area 13a of the insert 13. In this case the cover 15 covers the counter core 14 over the whole extension of the abutment side 14a and defines both the inner and outer end portions, 13b and 13c, of the insert 13.

As viewed from FIGS. 3 and 4, the cover 15 becomes remarkably thinner, due to the presence of the core itself, at the maximum thickness area 13a of the elastic support insert 13 taken as a whole. Under this situation the cover 15 at the maximum thickness area 13a of the elastic support insert should preferably have a minimum thickness between 1 and 2.5 mm, so as to suitably isolate the counter core from the carcass ply 10. However, it is also possible that the abutting side 14a of core 14 should extend within the cover 15 so far as to touch the first carcass ply 10.

It is noted that the dimensional ratios between the counter core 14 and cover 15 as well as the values of the respective moduli can vary even to a great extent depending on the operational features to be given to the tire 1.

As a rule it is possible to state that, the overall cross-sectional area of the elastic support insert 13 remaining the same, a size increase in the counter core 14 cross-section brings about an increase in the lift and direction steadiness under run flat conditions. In this connection it is noted that the embodiment shown in FIGS. 1 and 2, in which the counter core 14 extends as far as the belt structure edge, is particularly adapted to give excellent performance in terms of direction steadiness, resistance to side thrusts and lift, under run flat conditions.

On the contrary, a size reduction in the counter core cross-section will tend to improve the ride comfort. In this connection it is noted that the embodiment shown in FIGS. 3 and 4 is particularly adapted to offer an excellent ride comfort under normal ride conditions, that is when the tire is inflated to the normal pressure.

It is pointed out just as an example that when the tire 1 is to be used for normal road cars, the cross-sectional area of the counter core 14 should preferably be in the range of 30% to 60% of the overall cross-sectional area of the elastic support insert 13. In addition, still as a preferred solution, when the tire 1 is under normal inflation conditions the maximum radial extension of the counter core 14 should be included between ¼ and ¾ of the overall radial extension of the elastic support insert 13.

In both of the above described solutions, first and second annular reinforcing inserts 16, 17 are provided to be interposed between the first and second carcass piles 10, 11 at each of the tire sidewalls 5; they are of substantially lenticular form in cross-section and become thinner toward the ends. These reinforcing inserts 16, 17 are in consecutive alignment moving radially away from the tire axis and are interconnected with each other at a junction point 18 located substantially adjacent the maximum-thickness middle area 13a of the elastic support insert 13.

In greater detail, the first annular reinforcing insert 16 has its respective middle portion 16a disposed in side by side relation with the inner end portion 13b of the elastic support insert 13, substantially at the height of the end edge 9a of the corresponding filler 9. Departing from this middle portion 16a is a radially inner portion 16b extending alongside the filler 9 and substantially tapering to the bead core 8, as well as a radially outer portion 16c that becomes thinner away from the filler, tapering close to the junction point 18.

The second annular reinforcing insert 17 in turn has a middle portion 17a which is disposed in side by side relation with the outer end portion 13c of the elastic support insert 13, at the connection area, commonly referred to as "buttress" and denoted by 5a, between the tread band 3 and the corresponding sidewall 5. Departing from the middle portion 17a of the second reinforcing insert 17 is a radially inner portion 17a of the second towards the filler 9 up to the junction point 18, as well as a radially outer portion 17c tapering towards the underside of a corresponding edge of the belt structure 12.

The reinforcing inserts 16, 17 are made of elastomeric material having a dynamic modulus preferably ranging between 4 and 6 MPa, and at all events higher than the dynamic modulus of the cover 15 belonging to the elastic support insert 13.

The dimensional features of the reinforcing inserts 16, 17 as well as those of the elastic support inserts 13, can vary depending on the type of vehicle for which the tire 2 is intended, and on the operating features that the tire must possess.

As a rule, the thickness of the reinforcing inserts 16, 17 and the elastic support insert 13 is reduced when the tire 1 is intended for lightweight cars and/or in order to enhance the carcass strength at high speeds rather than the carcass life under run flat conditions. For example, when the tire 2 is intended for use in normal cars the thickness of the first reinforcing insert 16 should be conveniently included between 2.5 mm and 7 mm at the middle area 16a, whereas the thickness of the second reinforcing insert 17, reference being still made to the middle area 17a thereof, must be preferably included between 2.5 mm and 5 mm. The elastic support insert 13, in turn, will preferably have an overall thickness ranging from 5 mm to 15 mm, at the maximum thickness area 13a thereof.

In addition, the thickness of the first and second reinforcing inserts 16, 17 at the point of mutual junction 18 should preferably be less than 3.5 mm.

It should be noted too that if the tire 1 is of the tubeless type the whole inner surface of the carcass 2 will be coated with an air-tight sealing layer 19 made of elastomeric material based on a butyl blend for example.

The operating behavior of the tire of the invention described above mainly as regards structure is as follows, reference being made to the more complicated embodiment provided with two carcass plies 10 and 11.

It should be noted first of all that especially when the tire is in a deflated condition, the first and second reinforcing inserts 16, 17 enclosed between the first and second carcass plies 10, 11 substantially behave as two hinged arms, designed to rotate with respect to each other at the junction point 18 in order to assist the sidewall 5 deformations in a radial direction. Meanwhile, they elastically react substantially behaving like counter-bent leaf springs so as to inhibit deformations of the sidewall 5 resulting from side thrusts oriented parallel to the tire axis and taking place when a vehicle makes a turn.

The elastic support insert 13, in turn, substantially behaves like a spring counteracting the tendency of the first and second reinforcing inserts 16, 17 to move close to each other by effect of the load weighing on the motor-vehicle wheel as well as of possible side thrusts. In this connection it will be noted that the bending produced on the elastic support insert 13 is such that the maximum thickness area 13*a* of said insert will tend to move axially to the outside of the tire 1, so as to advantageously keep the carcass plies 10, 11 tensioned. This tensioning, which is on the other hand resisted by the consequent bending produced on the reinforcing inserts 16, 17, ensures the absence of localized compressive stresses on the carcass plies 10, 11 that would be highly dangerous for the structural integrity of the tire 1.

It is to be noted that said ply tensioning phenomenon as a consequence of the bending produced on the elastic support insert 13 and the resulting displacement of the maximum thickness area thereof, also takes place in a tire having a single carcass ply, where the beneficial effects of said phenomenon are present as well, although to a reduced degree.

During a normal use of the tire 1 the load weighing on the wheel is almost completely resisted by the air pressure within the tire. Under this situation, as shown in FIGS. 1 and 3, the elastic support insert 13 is only slightly bent and during the ride the dynamic stresses due to the presence of asperities on the roadway 4 are efficiently taken up by the elastic deformations imposed to the cover 15 of the elastic support insert 13. Advantageously, by virtue of the low dynamic modulus of the elastomeric material forming the cover 15, said dynamic stresses are substantially taken up within reaction forces being transmitted to the mounting rim 7 and hence the motor-vehicle structure.

Therefore the optimal conditions for a comfortable ride are achieved. In this connection it is also to be pointed out that under conditions of normal inflation pressure the counter core 14 is little concerned with said dynamic stresses and consequently does not transmit forces of a noticeable amount to the tire structure.

Referring now to FIGS. 2 and 4, should the tire 1 undergo a partial or complete loss of air pressure, as a result of a puncture for example, the vertical loads transmitted to the motor vehicle wheel are exclusively resisted by the elastic reactions resulting from the deformation of the sidewalls 5.

Under this situation the counter core 14 provided in each of the sidewalls 5, due to its high dynamic modulus, can withstand, without undergoing excessive elastic deformations, all compressive thrusts resulting from the important elastic deformation imposed to the cover 15, greatly bent around the core itself.

In conclusion, since the counter core 14 is located in the respective elastic support insert 13 just at the area where the greatest compressive efforts tend to concentrate, it prevents the elastomeric material forming the cover 15 and having a low modulus from collapsing by effect of said stresses.

The presence of the counter core 14 also protects the coating layer 19 from wear and overheating phenomena due to rubbings occurring at the maximum-chord point of the tire, thereby eliminating the necessity of introducing into the material used for making the coating layer, lubricants or other additives that could impair the air-tightness thereof.

As clearly shown in FIGS. 2 and 4, the outer cover 15 is substantially undeformed at the areas of reduced thickness, disposed close to the counter core 14, whereas important swellings are present at the radially internal end portion 13*b* (FIG. 2), or at the end portions 13*b*, 13*c* (FIG. 4) of the elastic support insert 13, that is to say where the cover faces the inner part of the tire 1.

This situation brings about an excellent distribution of the compressive efforts in the section of the elastic support inserts 13, unlike the behavior of any type of known self-bearing carcass where the compressive efforts were concentrated at the maximum-chord point of the tire and tended to produce localized overheatings.

It will be also recognized that the presence of swellings at the end portions 13*b*, 13*c* of the elastic support insert 13 is evidence of the presence in the cover 15 of basically tensive surface efforts, that is efforts capable of eliminating any risk of overheating due to localized rubbings in mutually contacting surfaces.

Therefore, as compared to the known art, the invention has achieved an important improvement in the distribution of the stresses within the carcass, thereby offering a longer lifetime for the tire. At the same time, the use of elastomeric material of low modulus for the elastic support insert 13 instead of highly stiff elastomeric material as necessarily required in the known art, leads to an important improvement in the ride comfort, without on the other hand reducing the operating self-supporting features of the tire.

In this connection, the results of practical tests comparing the tire embodying the solutions shown in FIGS. 3 and 4 with a geometrically identical tire having however an elastic support insert of monolithic form made in accordance with the known art have shown that the tire of the invention offers a 10% reduction in vertical stiffness and a 50% increase in the distance covered under run flat conditions.

Obviously, many modifications and variations may be made to the invention as conceived. In particular, it is pointed out that the invention is also suitable for a carcass devoid of the reinforcing inserts 16, 17 which are on the contrary provided in the preferred embodiment herein described.

I claim:

1. A self-supporting tire for motor vehicle wheels, incorporating elastic support inserts in sidewalls thereof, comprising a carcass, a tread band disposed on a radially outer surface of said carcass, a circumferentially-inextensible annular belt structure, positioned on said carcass and radially inward of said tread band, said carcass further including:

a pair of circumferentially inextensible bead cores, each positioned within a bead defined along an inner circumferential edge of the tire;

a pair of elastomeric fillers each of which extends along an outer circumferential edge of one of the bead cores and tapers radially outwardly from its respective bead core;

at least one carcass ply having radially inner edges each folded back around a respective one of said bead cores and a respective one of said elastomeric fillers;

at least one pair of annular elastic support inserts of lenticular cross-sectional form, made of elastomeric material, each of which is secured to an axially inner surface of one of the tire sidewalls and extends in a radial direction between one of the beads and a corresponding side edge of the belt structure, each of said annular elastic support inserts comprising:

(i) a counter core of substantially lenticular cross-sectional form, positioned in an area of maximum thickness of said annular elastic support insert, and having an axial outwardly facing abutment side of convex profile facing said at least one carcass ply;

(ii) an elastically deformable cover contacting the counter core covering said convex abutment side thereof and defining in substantially opposite directions, radially internal and radially external end portions of the annular elastic support insert, said cover having a dynamic modulus which is lower than that of said counter core.

2. A tire according to claim 1, in which said counter core is located substantially at the maximum width point of the tire when the tire is under completely deflated conditions.

3. A tire according to claim 1, in which the cover at the counter core has a minimum thickness lower than 2.5 mm.

4. A tire according to claim 1, having a first and a second carcass ply and further comprising, within each tire sidewall, a first and a second annular reinforcing insert made of elastomeric material, interposed between the first carcass ply and the second carcass ply which is disposed axially and radially outwardly of the first carcass ply, said first and second annular reinforcing inserts having a substantially lenticular cross-section, each annular reinforcing insert becoming thinner towards its ends, said annular reinforcing inserts being mutually interconnected at a junction point located substantially at the area of maximum thickness of the corresponding annular elastic support insert.

5. A tire according to claim 1, in which each said elastically deformable cover has a dynamic modulus in the range of 2 to 6 MPa.

6. A tire according to claim 1, in which each said counter core has a dynamic modulus in the range of 8 to 16 MPa.

7. A tire according to claim 1, in which each counter core is made of elastomeric material incorporating reinforcing fibers.

8. A tire according to claim 1, in which the cross sectional area of each counter core is in the range of 30% to 60% of the overall cross sectional area of the corresponding one of said annular elastic support inserts.

9. A tire according to claim 1, in which the maximum radial extension of each counter core is between ¼ and ¾ of the overall radial extension of the corresponding one of said annular elastic support inserts.

* * * * *